(12) United States Patent
Furukawa et al.

(10) Patent No.: US 7,497,889 B2
(45) Date of Patent: Mar. 3, 2009

(54) EXHAUST EMISSION CONTROL DEVICE

(75) Inventors: Takatoshi Furukawa, Hino (JP);
Yoshihide Takenaka, Hino (JP); Koichi
Machida, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 457 days.

(21) Appl. No.: 10/558,705

(22) PCT Filed: Jun. 2, 2004

(86) PCT No.: PCT/JP2004/007610

§ 371 (c)(1),
(2), (4) Date: Nov. 29, 2005

(87) PCT Pub. No.: WO2004/109069

PCT Pub. Date: Dec. 16, 2004

(65) Prior Publication Data
US 2007/0017371 A1 Jan. 25, 2007

(30) Foreign Application Priority Data
Jun. 3, 2003 (JP) ............................. 2003-157676

(51) Int. Cl.
B03C 3/49 (2006.01)
B01D 46/00 (2006.01)
F01N 3/022 (2006.01)
F01N 3/023 (2006.01)

(52) U.S. Cl. .................... 55/523; 55/282.2; 55/282.3;
55/385.3; 55/484; 55/524; 55/DIG. 10; 55/DIG. 30;
55/DIG. 38; 60/274; 60/275; 60/297; 60/311;
422/186.04; 96/65; 96/68; 96/99

(58) Field of Classification Search ................ 55/282.2,
55/282.3, 385.3, 482, 483, 484, 523, 524,
55/DIG. 10, DIG. 30, DIG. 38; 60/274, 275,
60/295, 297, 298, 299, 300, 303, 311; 422/186.04;
96/65, 66, 68, 69, 99
See application file for complete search history.

(56) References Cited
U.S. PATENT DOCUMENTS 6,517,786 B1 * 2/2003 Best et al. ............... 422/186.04
6,660,061 B2 * 12/2003 Josephson et al. .......... 55/282.3
7,364,606 B2 * 4/2008 Shimoda et al. ................ 96/54

(Continued)

FOREIGN PATENT DOCUMENTS
JP 2001-522302 11/2001

(Continued)

Primary Examiner—Jason M Greene
(74) Attorney, Agent, or Firm—Oblon, Spivak, McClelland, Maier & Neustadt, P.C.

(57) ABSTRACT

Arranged within a cylindrical housing are capturing cells each including a cylindrical outer electrode capable of capturing particulates and an inner electrode inserted into the outer electrode and lined at its outer surface with a dielectric. A divergent exhaust unit is arranged on an end of the housing so as to guide exhaust to interiors in the respective capturing cells. A convergent exhaust unit is arranged on the other end of the housing so as to communicate with a gap between an inner surface of the housing and outer surfaces of the outer electrodes in the respective cells. The inner and outer electrodes are connected to an electric discharge controller.

1 Claim, 8 Drawing Sheets

U.S. PATENT DOCUMENTS

| | | | |
|---|---|---|---|
| 2005/0229564 A1* | 10/2005 | Okubo et al. | 55/523 |
| 2006/0254264 A1* | 11/2006 | Takenaka et al. | 60/311 |
| 2007/0028603 A1* | 2/2007 | Igarashi | 60/297 |
| 2007/0266702 A1* | 11/2007 | Cotton | 60/298 |
| 2008/0118410 A1* | 5/2008 | Furukawa et al. | 422/186.04 |

FOREIGN PATENT DOCUMENTS

| | | |
|---|---|---|
| JP | 2002-501813 | 1/2002 |
| JP | 2002-276333 | 9/2002 |
| WO | 01/92694 | 12/2001 |

* cited by examiner

EXHAUST EMISSION CONTROL DEVICE

TECHNICAL FIELD

The present invention relates to an exhaust emission control device.

BACKGROUND ART

Particulates or particulate matter entrained in exhaust (burned gas of diesel oil) from a diesel engine is mainly constituted by carbonic soot and a soluble organic fraction (SOF) of high-boiling hydrocarbon and contains a trace of sulfate (misty sulfuric acid fraction).

In order to suppress the particulates from being diffused into atmosphere, conventionally a filter for capturing particulates is incorporated in an engine exhaust system.

An example of the particulate filter comprises a honeycomb core made of ceramics such as cordierite and having a number of passages compartmentalized by porous thin walls, exhaust from an engine flowing through the passages.

In the above-mentioned particulate filter, alternate ones of the parallel passages have plugged one ends so as to guide the exhaust to unplugged one ends of the gas passages adjacent thereto; the passages through which the exhaust flows have the plugged other ends so as to connect unplugged other ends of the gas passages adjacent thereto to a muffler.

Thus, the particulates entrained in the exhaust are captured by the porous thin walls and only the exhaust passing through the walls is discharged to the atmosphere.

The particulates attached to the thin walls will spontaneously ignite to be oxidized when an engine operating status is shifted to a region with increased exhaust temperature.

However, for example, in a shuttle-bus running mainly on city roads with generally lower running speeds, there is few chance to continue an engine operational status capable of obtaining exhaust temperature suited for oxidation treatment of the particulates. As a result, a captured particulate amount will exceed an oxidized amount, leading to clogging of the porous thin walls.

Thus, recently, a plasma assisted exhaust emission control device (gas treatment reactor vessel) has been proposed which can oxidize particulates even if exhaust temperature is low (See, for example, Reference 1).

In this exhaust emission control device, inner and outer electrodes in the form of drilled stainless cylinders are coaxially arranged in a chamber. A gap between the electrodes is charged with dielectrics in the form of pellets so as to allow the exhaust to pass. The exhaust from the engine is guided to a gap between the chamber and the outer electrode.

Thus, the particulates entrained in the exhaust supplied from between the chamber and the outer electrode to the pellet charged layer are attached to the pellets and only the exhaust passing through the pellet charged layer is discharged to the atmosphere.

Moreover, higher voltage is applied across the electrodes to generate discharge plasma and excite the exhaust, so that unburned hydrocarbon, oxygen and nitrogen monoxide are activated into oxygen-containing hydrocarbon, ozone and nitrogen dioxide, respectively.

Thus, even with lower exhaust temperature, the particulates attached to the pellets will spontaneously ignite to be oxidized.

[Reference 1] JP 2002-501813A

SUMMARY OF THE INVENTION

Problems to be Solved by the Invention

To increase a captured particulate area in the exhaust emission control device as disclosed in Reference 1 above requires the inner and outer electrodes to be extended in a direction of flow of the exhaust; alternatively, the distance between the electrodes is required to be increased to increase a charged pellet amount.

However, such extension of the electrodes in the direction of flow of the exhaust will increase flow path resistance; to increase the distance between the electrodes will result in failure of generating discharge plasma unless voltage applied is increased.

The invention was made in view of the above and has its object to provide an exhaust emission control device with high removal efficiency of particulates and with easiness in maintenance.

Means or Measure for Solving the Problems

In order to attain the above object and according to a first aspect of the invention, provided are a plurality of capturing cells each including a cylindrical outer electrode constituted by an electrically conductive filter capable of capturing particulates, a rod-like inner electrode inserted into the outer electrode and a dielectric for lining an outer surface of the inner electrode, a cylindrical housing within which said capturing cells are arranged in parallel with each other, exhaust divergence means on one end of the housing and in communication with interiors of the outer electrodes in the respective capturing cells and exhaust convergence means on the other end of the housing and in communication with a gap between an inner surface of the housing and outer surfaces of the respective capturing cells, voltage necessary for generation of electric discharge being applicable across the inner and outer electrodes.

According to a second aspect of the invention, provided are a plurality of capturing cells each including a cylindrical inner electrode constituted by an electrically conductive filter capable of capturing particulates, a cylindrical outer electrode surrounding said inner electrode and a dielectric for lining an inner surface of the outer electrode, a cylindrical housing within which said capturing cells are arranged in parallel with each other, exhaust divergence means on one end of the housing and in communication with a gap between an inner surface of the dielectric and an outer surface of the inner electrode in each of the capturing cells, exhaust convergence means on the other end of the housing and in communication with an interior of the inner electrode in each of the capturing cells, voltage necessary for generation of electric discharge being applicable across the inner and outer electrodes.

According to a third aspect of the invention, provided are a plurality of capturing cells each including a cylindrical inner electrode constituted by an electrically conductive filter capable of capturing particulates, a cylindrical dielectric surrounding said inner electrode and a cylindrical outer electrode constituted by an electrically conductive filter capable of capturing particulates and surrounding said dielectric, a cylindrical housing within which said capturing cells are arranged in parallel with each other, exhaust divergence means on one end of the housing and in communication with a gap between an inner surface of the dielectric and an outer surface of the inner electrode in each of the capturing cells and a gap between an inner surface of the outer electrode and an outer surface of the dielectric in each of the capturing cells and exhaust convergence means on the other end of the housing and in communication with an interior of the inner electrode in each of the capturing cells, voltage necessary for generation of electric discharge being applicable across the inner and outer electrodes.

In the first aspect of the invention, the cylindrical outer electrodes capable of capturing particulates are arranged in parallel with each other so as to increase a captured particulate area without prolonging the flow path of the exhaust.

The rod-like inner electrode is inserted into the outer electrode for decrease of the distance between the electrodes so as to decrease applied voltage necessary for generation of discharge plasma.

In the second aspect of the invention, the cylindrical inner electrodes capable of capturing particulates are arranged in parallel with each other so as to increase a captured particulate area without prolonging the flow path of the exhaust.

The inner electrode is surrounded by the cylindrical outer electrode for decrease of the distance between the electrodes so as to decrease applied voltage necessary for generation of discharge plasma.

In the third aspect of the invention, the cylindrical inner and outer electrodes capable of capturing particulates are respectively arranged in parallel with each other so as to increase a captured particulate area without prolonging the flow path of the exhaust.

The inner electrode is surrounded by the outer electrode for decrease of the distance between the electrodes so as to decrease applied voltage necessary for generation of discharge plasma.

Effects of the Invention

According to an exhaust emission control device of the invention, the following various excellent meritorious effects are obtained.

(1) According to the first aspect of the invention, the outer cylindrical electrodes capable of capturing particulates are arranged in parallel with each other, so that the captured particulate area can be increased without prolonging the flow path of the exhaust, whereby the removal efficiency of the particulates can be enhanced.

(2) The rod-like inner electrode is inserted into the outer electrode for decrease of the distance between the electrodes, so that the applied voltage necessary for generation of discharge plasma can be decreased.

(3) According to the second aspect of the invention, the cylindrical inner electrodes capable of capturing particulates are arranged in parallel with each other, so that the captured particulate area can be increased without prolonging the flow path of the exhaust; the particulates are captured by the inner electrodes, each of which has high electric field strength and high plasma energy, so that the removal efficiency of the particulates upon generation of plasma can be enhanced.

(4) The inner electrode is surrounded by the cylindrical outer electrode for decrease of the distance between the electrodes, so that the applied voltage necessary for generation of discharge plasma can be decreased.

(5) According to the third aspect of the invention, the cylindrical inner and outer electrodes capable of capturing particulates are respectively arranged in parallel with each other, so that captured particulate area can be increased without prolonging the flow path of the exhaust; and the particulates are captured mainly by the inner electrodes, each of which has high electric field strength and high plasma energy, so that the removal efficiency of the particulates upon generation of plasma can be enhanced.

(6) The inner electrode is surrounded by the outer electrode for decrease of the distance between the electrodes, so that the applied voltage necessary for generation of discharge plasma can be decreased.

BEST MODE FOR CARRYING OUT THE INVENTION

Embodiments of the invention will be described with reference to the drawings.

Embodiment 1

FIGS. 1 to 4 show a first embodiment of an exhaust emission control device according to the invention. This exhaust emission control device comprises a cylindrical housing 1, a plurality of capturing cells 2 arranged in parallel with each other within the housing 1 and exhaust divergence and convergence means 3 and 4 at one and the other ends of the housing 1, respectively.

Each of the cells 2 comprises a cylindrical outer electrode 7 constituted by an electrically conductive filter capable of capturing particulates and a rod-like inner electrode 6 coaxially arranged within the outer electrode 7 and having an outer surface lined with a dielectric 5 made of for example ceramics.

The electrically conductive filter may be fibrous metal laminated and sintered into integrity, sintered body of metallic powder, fine metallic mesh laminated and sintered into integrity or metallic powder carried by fine metallic mesh through sintering; any of them may capture the particulates while ensuring passing of the gas.

The exhaust divergence means 3 comprises a support plate 8 in close contact with a whole outer peripheral surface of an end of the outer electrode 7 in each of the capturing cells 2 and in close contact with a whole inner peripheral surface of one end of the housing 1, and an inlet 9 on the one end of the housing 1 and into which exhaust G from an engine (not shown) flows.

The exhaust convergence means 4 comprises a support plate 10 fitted over the electrodes 6 and 7 in the respective cells 2 to retain relative positions of the electrodes 6 and 7 and abutting on a predetermined portion of the other end of the housing 1, and an outlet 11 on the other end of the housing 1 and in communication with a muffler (not shown).

The support plate 10 has a central opening 12. Gaps 13 are formed on portions of the plate 10 not in abutment with the housing 1.

Thus, a gap 14 between the inner surface of the housing 1 and the outer surfaces of the outer electrodes 7 is communicated with the outlet 11 through the opening 12 and gaps 13.

The opening 12 and gaps 13 are not limited to the shapes shown in FIGS. 2 to 4; they may be of any shapes other than those shown provided that the gap 14 can be communicated with the outlet 11.

The above-mentioned support plates 8 and 10 are made from heat-resisting and insulating material such as ceramics so as to retain electric insulation between the housing 1 and the electrodes 6 and 7 to one another.

The electrodes 6 and 7 in each of the cells 2 are connected through an electric discharge controller 15 to an in-vehicle power supply 16 such as alternator; voltage necessary for generation of electric discharge can be applied with the electrodes 6 and 7 utilized as anode and cathode, respectively.

As shown in FIG. 1, a plurality of insulators in the form of circumferentially equidistantly arranged spacers 17 are interposed between the outer and inner surfaces on the one ends of the electrodes 6 and 7, respectively, so as to maintain constant the distance between the electrodes 6 and 7; moreover, a plurality of insulators in the form of spacers 18 closely contact the support plate 10 so as to be positioned circumferentially equidistantly of the electrodes 6 and 7 (these spacers 17 and 18 are omitted from FIGS. 2 and 3).

Each of the spacers 17 is, for example, short in its axial length to its diameter, i.e., in the shape of spindle or abacus bead so as to prevent linear electric discharge along outer surfaces of the spacer 17; each of the spacers 18 is, for example, in the shape of axially cut half of the spacer 17 so as to prevent linear electric discharge along outer surfaces of the spacer 18 and/or along an end surface of the support plate 10.

In this exhaust emission control device, the exhaust G from the engine flows via the inlet 9 of the divergence means 3 into interiors of the outer electrodes 7 in the respective cells 2, passes through the outer electrodes 7 from inwardly to outwardly thereof and then flows via the opening 12, the gaps 13 and the outlet 11 of the convergence means 4 into the muffler.

Thus, the particulates entrained in the exhaust G are captured by the outer electrodes 7 which are the electrically conductive filters.

Moreover, higher voltage is properly applied across the inner and outer electrodes 6 and 7 to generate discharge plasma and activate unburned hydrocarbon, oxygen and nitrogen monoxide into oxygen-containing hydrocarbon, ozone and nitrogen dioxide, respectively, so that the particulates will spontaneously ignite to be oxidized.

In the exhaust emission control device shown in FIGS. 1 to 4, the cylindrical outer electrodes 7 capable of capturing the particulates are arranged in parallel with each other so that the flow path of the exhaust G is not prolonged even if the captured area of the particulates is increased.

Moreover, the rod-like inner electrode 6 is inserted into the outer electrode 7, so that the distance between the electrodes 6 and 7 can be shortened to lower the applied voltage necessary for generation of discharge plasma.

Embodiment 2

FIGS. 5 to 8 show a second embodiment of an exhaust emission control device according to the invention. This exhaust emission control device comprises a cylindrical housing 21, a plurality of capturing cells 22 arranged in parallel with each other in the housing and exhaust divergence and convergence means 23 and 24 on one and the other ends of the housing 21, respectively.

Each of the cells 22 comprises a cylindrical outer electrode 26 internally lined with dielectric 25 made of such as ceramics and a cylindrical inner electrode 27 coaxially arranged within the outer electrode 26 and constituted by an electrically conductive filter capable of capturing the particulates.

The exhaust divergence means 23 comprises a support plate 28 closely contacting a whole outer peripheral surface of an end of the outer electrode 26 in each of the capturing cells 22 and closely contacting a whole inner peripheral surface of one end of the housing 21, plugs 29 which close the one ends of the inner electrodes 27 and an inlet 30 on the one end of the housing 21 into which exhaust G from an engine flows for inflow into gaps 31 each between an inner surface of the dielectric 25 and an outer surface of the inner electrode 27.

The exhaust convergence means 24 comprises a support plate 32 fitted over the other ends of the inner electrodes 27 and dielectric 25 in the respective capturing cells 22 to maintain constant relative positions of the electrodes 26 and 27 and abutting on a whole inner peripheral surface of the other end of the housing 21, and an outlet 33 on the other end of the housing 21 in communication with a muffler, the support plate 32 being formed with a plurality of openings 34 in communication with interiors of the respective inner electrodes 27.

The above-mentioned support plates 28 and 32 are made from heat-resisting and insulating material such as ceramics so as to retain electric insulation between the housing 21 and the electrodes 26 and 27 to one another.

Moreover, the electrodes 26 and 27 in each of the cells 22 are connected to an in-vehicle power supply 36 such as an alternator through an electric discharge controller 35; voltage necessary for generation of electric discharge is applicable with the electrodes 27 and 26 being utilized as anode and cathode, respectively.

Those similar to the above-mentioned spacers 17 (see FIG. 1) are interposed between the outer and inner surfaces on the one ends of the inner electrode 27 and dielectric 25, respectively; and those similar to the spacers 18 (see FIG. 1) closely contact the support plate 32 and are positioned between the inner electrode 27 and dielectric 25 so as to prevent useless electric discharge.

In this exhaust emission control device, the exhaust G from the engine flows via the inlet 30 of the divergence means 23 into the gaps 31 in the respective cells 22, passes through the inner electrodes 27 from outwardly to inwardly thereof and then flows via the openings 34 of the plate 32 and the outlet 33 of the convergence means 24 into the muffler.

Thus, the particulates entrained in the exhaust G are captured by the inner electrodes 27 which are the electrically conductive filters.

Moreover, higher voltage is properly applied across the inner and outer electrodes 27 and 26 to generate discharge plasma and activate unburned hydrocarbon, oxygen and nitrogen monoxide into oxygen-containing hydrocarbon, ozone and nitrogen dioxide, respectively, so that the particulates will spontaneously ignite to be oxidized.

In the exhaust emission control device shown in FIGS. 5 to 8, the cylindrical inner electrodes 27 capable of capturing the particulates are arranged in parallel with each other so that the flow path of the exhaust G is not prolonged even if the captured area of the particulates is increased.

Moreover, the inner electrode 27 is surrounded by the cylindrical outer electrode 26, so that the distance between the electrodes 26 and 27 can be shortened to lower the applied voltage necessary for generation of discharge plasma.

Embodiment 3

FIGS. 9 to 12 show a third embodiment of an exhaust emission control device according to the invention. This exhaust emission control device comprises a cylindrical housing 41, a plurality of capturing cells 42 arranged in parallel with each other in the housing and exhaust divergence and convergence means 43 and 44 on one and the other ends of the housing 41, respectively.

Each of the cells 42 comprises a cylindrical outer electrode 45 constituted by an electrically conductive filter capable of capturing the particulates, a cylindrical dielectric 46 arranged coaxially within the outer electrode and a cylindrical inner electrode 47 coaxially arranged within the dielectric 46 and constituted by an electrically conductive filter capable of capturing the particulates.

The exhaust divergence means 43 comprises a support plate 48 closely contacting a whole outer peripheral surface of an end of the outer electrode 45 in each of the capturing cells 42 and closely contacting a whole inner peripheral surface of one end of the housing 41, plugs 49 which close the one ends of the inner electrodes 47 and an inlet 50 on the one end of the housing 41 into which exhaust G from an engine flows for inflow into gaps 51 each between an inner surface of the dielectric 46 and an outer surface of the inner electrode 47 and into gaps 52 each between an outer surface of the dielectric 46 and an inner surface of the outer electrode 45.

Spacers 53 are interposed between the outer surface of the inner electrode 47 and the inner surface of the dielectric 46 so as to retain relative positions of these members constant without clogging the gap 51; spacers 54 are interposed between the outer surface of the dielectric 46 and the inner surface of the outer electrode 45 so as to retain relative positions of these members constant without clogging the gap 52.

The exhaust convergence means 44 comprises spacers 55 each fitted to the other ends of the electrodes 45 and 47 and dielectric 46 in each of the cells 42 so as to retain relative positions of these members constant, spacers 56 which retain constant relative positions of the outer electrodes 45 to the housing 41 and an outlet 57 on the other end of the housing 41 and in communication with the muffler.

Each of the spacers 55 is annular-shaped and closes the other ends of the gaps 51 and 52, the central openings 58 being in communication with the interiors of the inner electrodes 47.

These spacers 55 and 56 are made from heat-resisting and insulating material such as ceramics so as to retain electric insulation between the housing 41 and the electrodes 45 and 47 to one another.

Moreover, the electrodes 45 and 47 in each of the cells 42 are connected to an in-vehicle power supply 60 such as an alternator through an electric discharge controller 59; voltage necessary for generation of electric discharge is applicable with the electrodes 47 and 45 being utilized as anode and cathode, respectively.

The plural outer electrodes 45 may be in a position relationship such that the adjacent outer electrodes 45 abut on each other at their outer surfaces.

Those similar to the above-mentioned spacers 17 (See FIG. 1) are interposed between the outer and inner surfaces on the one ends of the inner electrode 47 and dielectric 46, respectively, and between the inner and outer surfaces on the one ends of the outer electrode 45 and dielectric 46, respectively; and those similar to the spacers 18 (See FIG. 1) closely contact the spacers 55 and are positioned between the inner electrode 47 and dielectric 46 and between the outer electrode 45 and dielectric 46 so as to prevent useless electric discharge.

In this exhaust emission control device, the exhaust G from the engine flows via the inlet 50 of the divergence means 43 into the gaps 51 and 52 in the respective cells 42, passes through the inner electrodes 47 from outwardly to inwardly thereof or through the outer electrode 45 from inwardly to outwardly thereof and then flows via the openings 58 of the spacers 55 and the outlet 57 of the convergence means 44 into a muffler.

Thus, the particulates entrained in the exhaust G are captured by the inner and outer electrodes 47 and 45 which are electrically conductive filters.

Moreover, higher voltage is properly applied across the inner and outer electrodes 47 and 45 to generate discharge plasma and activate unburned hydrocarbon, oxygen and nitrogen monoxide into oxygen-containing hydrocarbon, ozone and nitrogen dioxide, respectively, so that the particulates will spontaneously ignite to be oxidized.

In the exhaust emission control device shown in FIGS. 9 to 12, the cylindrical inner and outer electrodes 47 and 45 capable of capturing the particulates are respectively arranged in parallel with each other so that the flow path of the exhaust G is not prolonged even if the captured area of the particulate is increased.

Moreover, the inner electrode 47 is surrounded by the cylindrical outer electrode 45, so that the distance between the electrodes 45 and 47 can be shortened to lower the applied voltage necessary for generation of discharge plasma.

It is to be understood that an exhaust emission control device according to the present invention is not limited to the above-mentioned embodiments and that various changes and modifications may be made without leaving the gist of the invention.

INDUSTRIAL APPLICABILITY

An exhaust emission control device according to the invention may be applicable to various types of vehicles.

EXPLANATION OF THE REFERENCE NUMERALS

Figure 1:
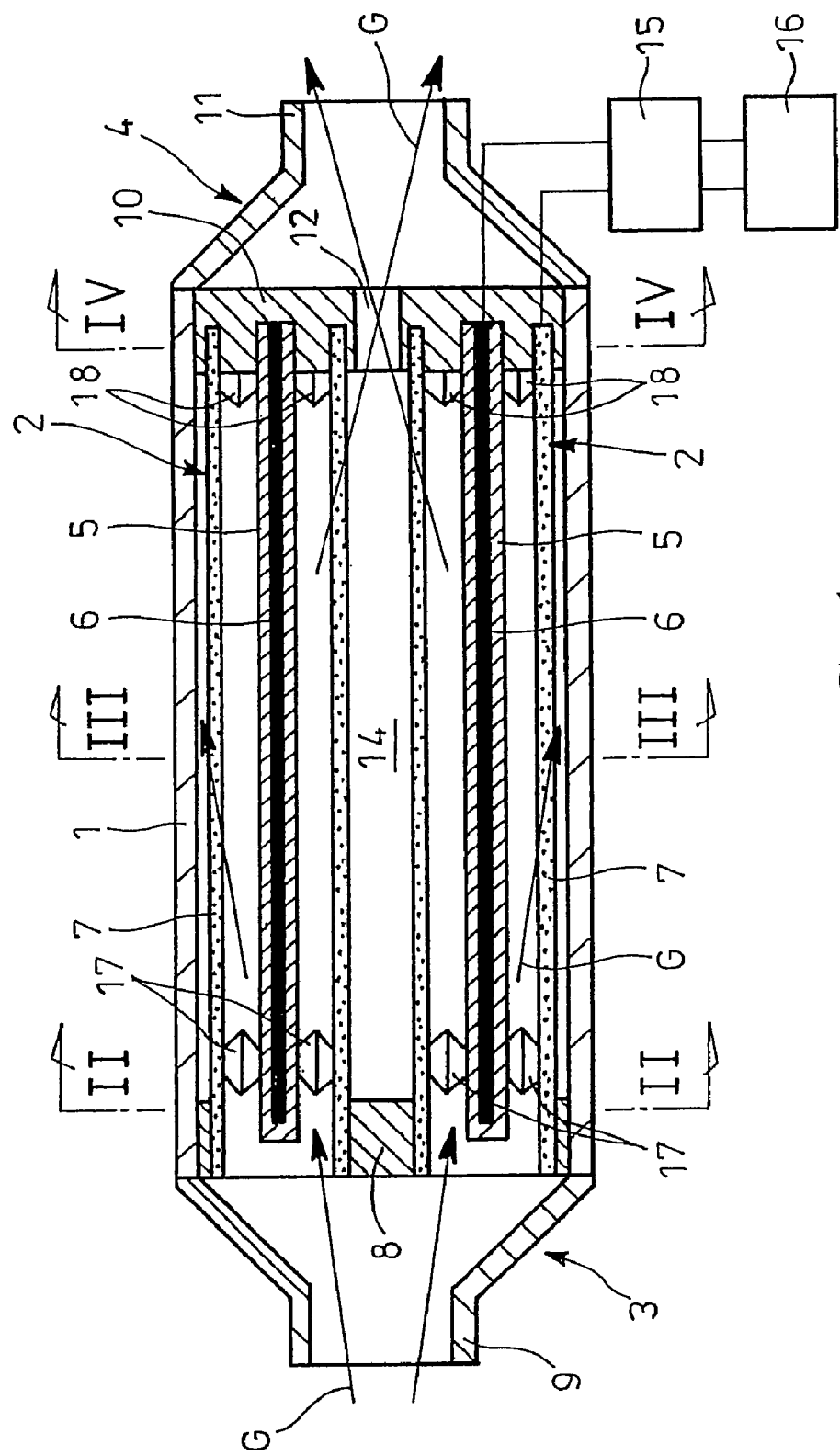
[FIG. 1] A longitudinal sectional view showing a first embodiment of an exhaust emission control device according to the invention.
Figure 2:
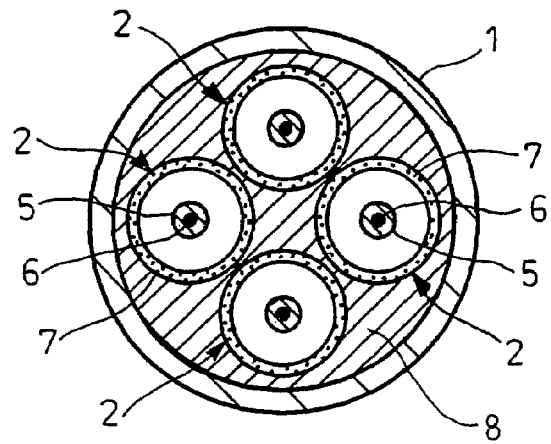
[FIG. 2] A view looking in the direction of arrows II in FIG. 1.
Figure 3:
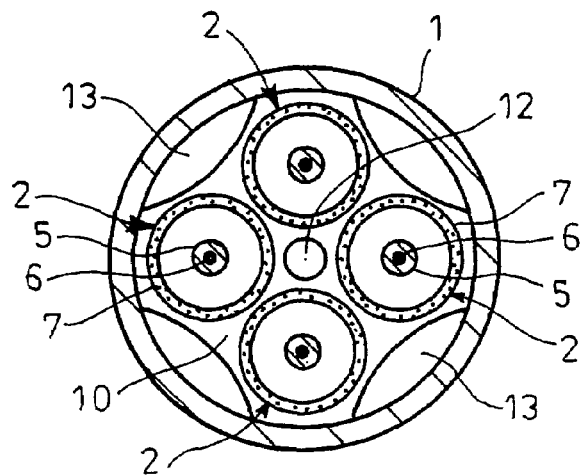
[FIG. 3] A view looking in the direction of arrows III in FIG. 1.
Figure 4:
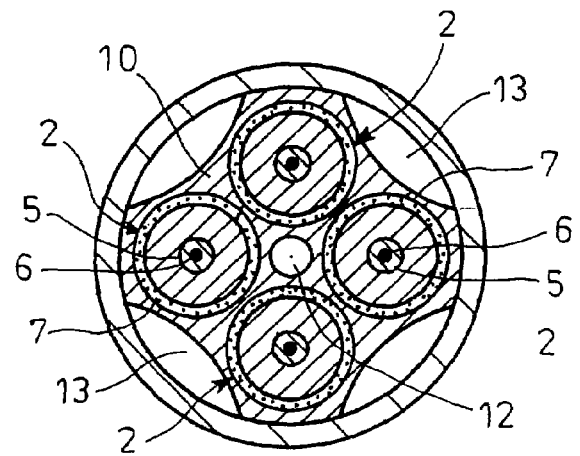
[FIG. 4] A view looking in the direction of arrows IV in FIG. 1.
Figure 5:
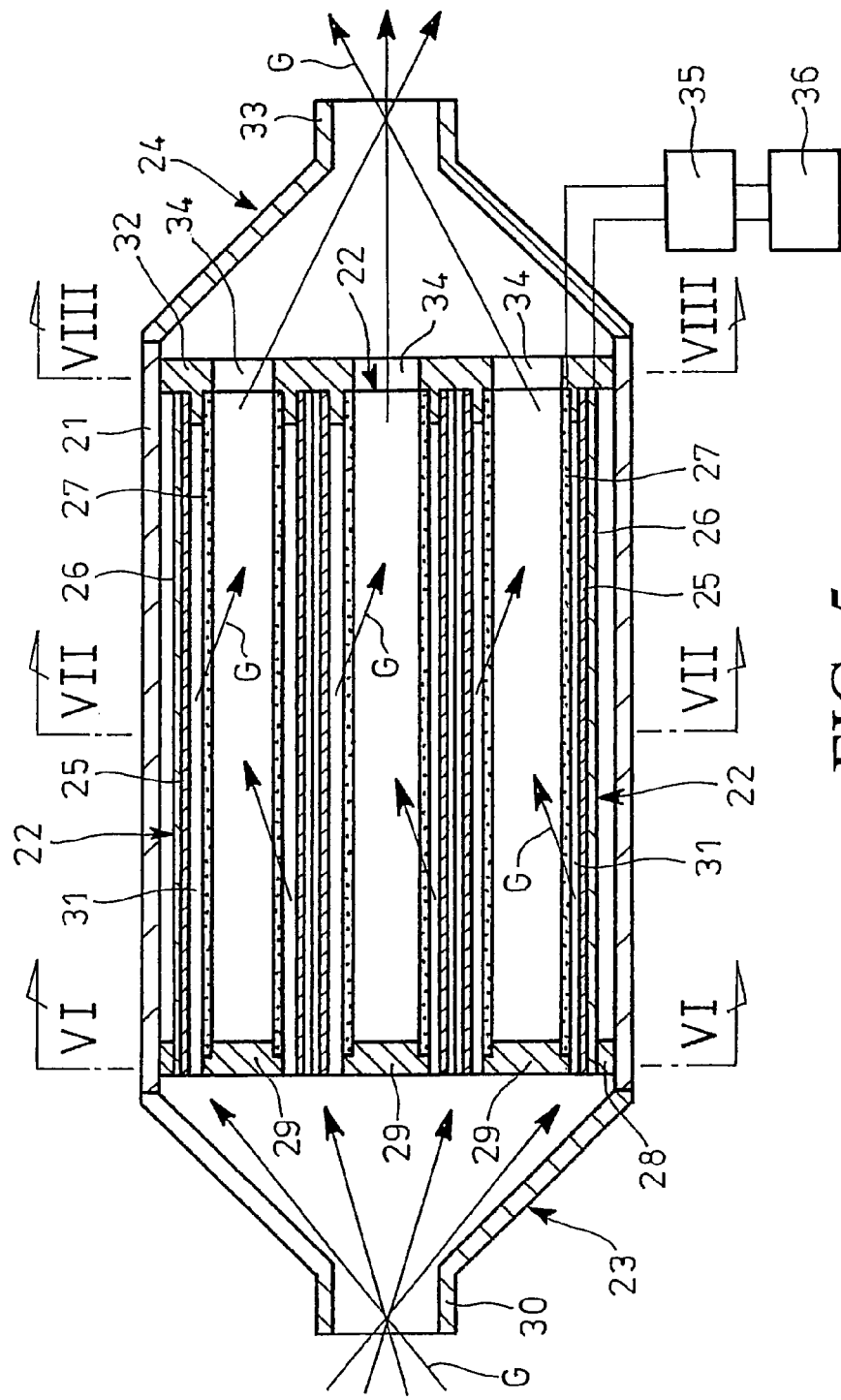
[FIG. 5] A longitudinal sectional view showing a second embodiment of an exhaust emission control device according to the invention.
Figure 6:
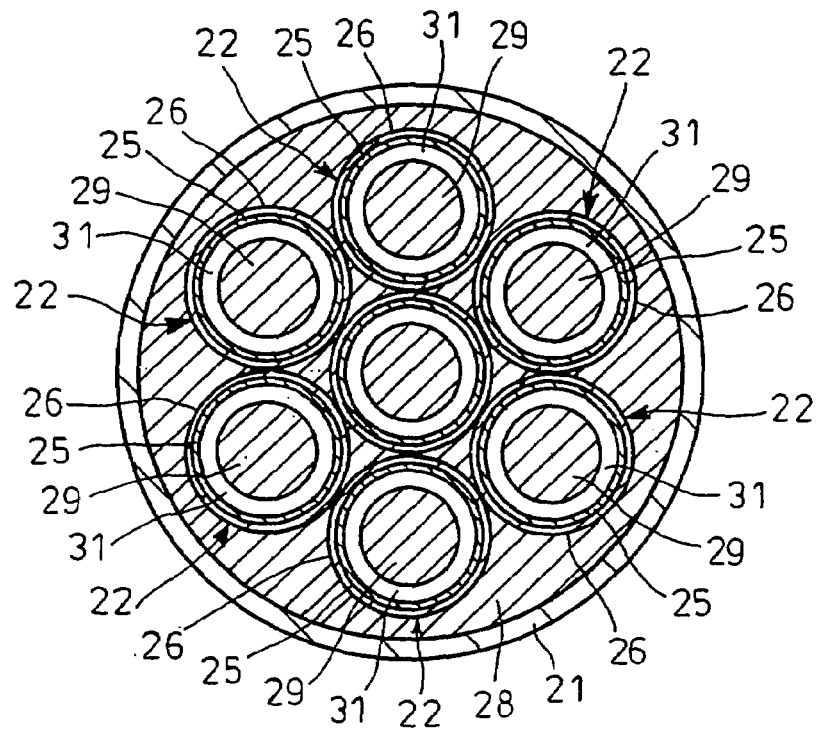
[FIG. 6] A view looking in the direction of arrows VI in FIG. 5.
Figure 7:
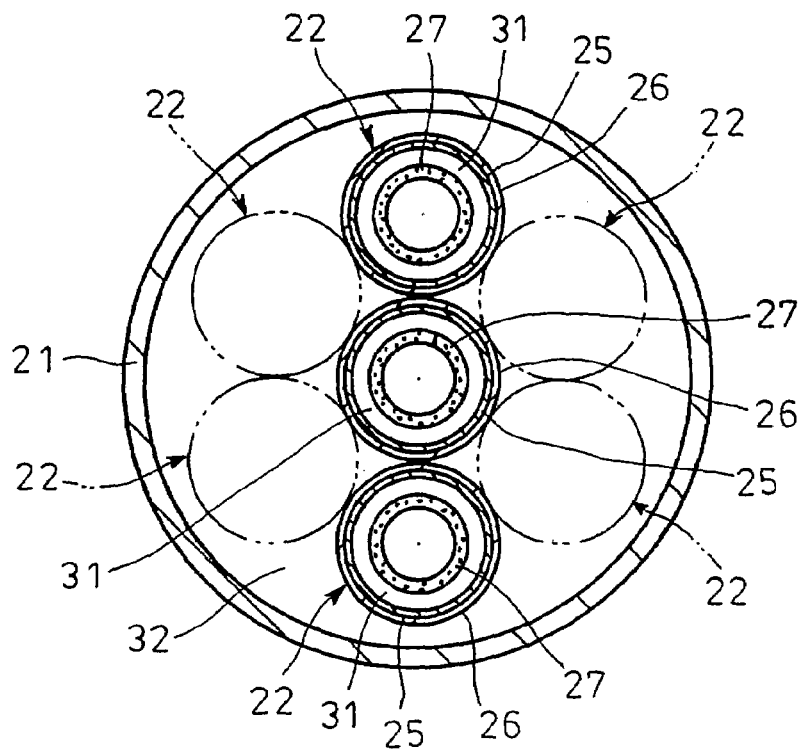
[FIG. 7] A view looking in the direction of arrows VII in FIG. 5.
Figure 8:
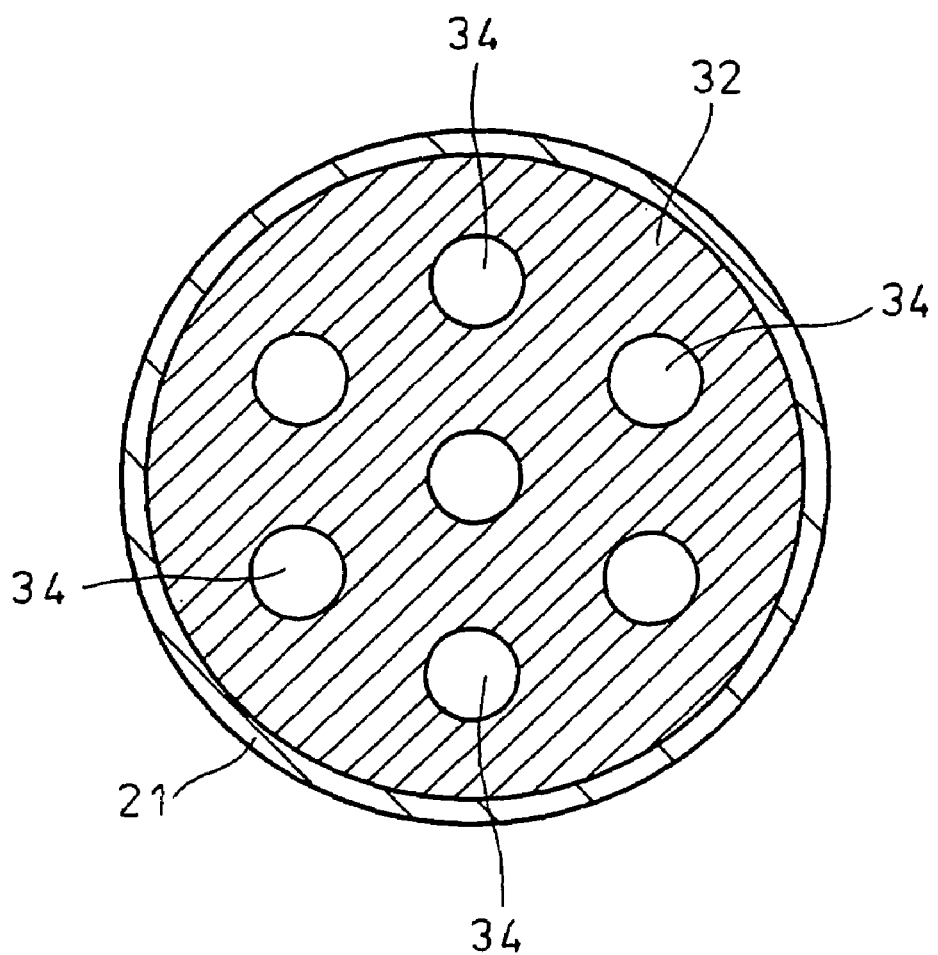
[FIG. 8] A view looking in the direction of arrows VIII in FIG. 5.
Figure 9:
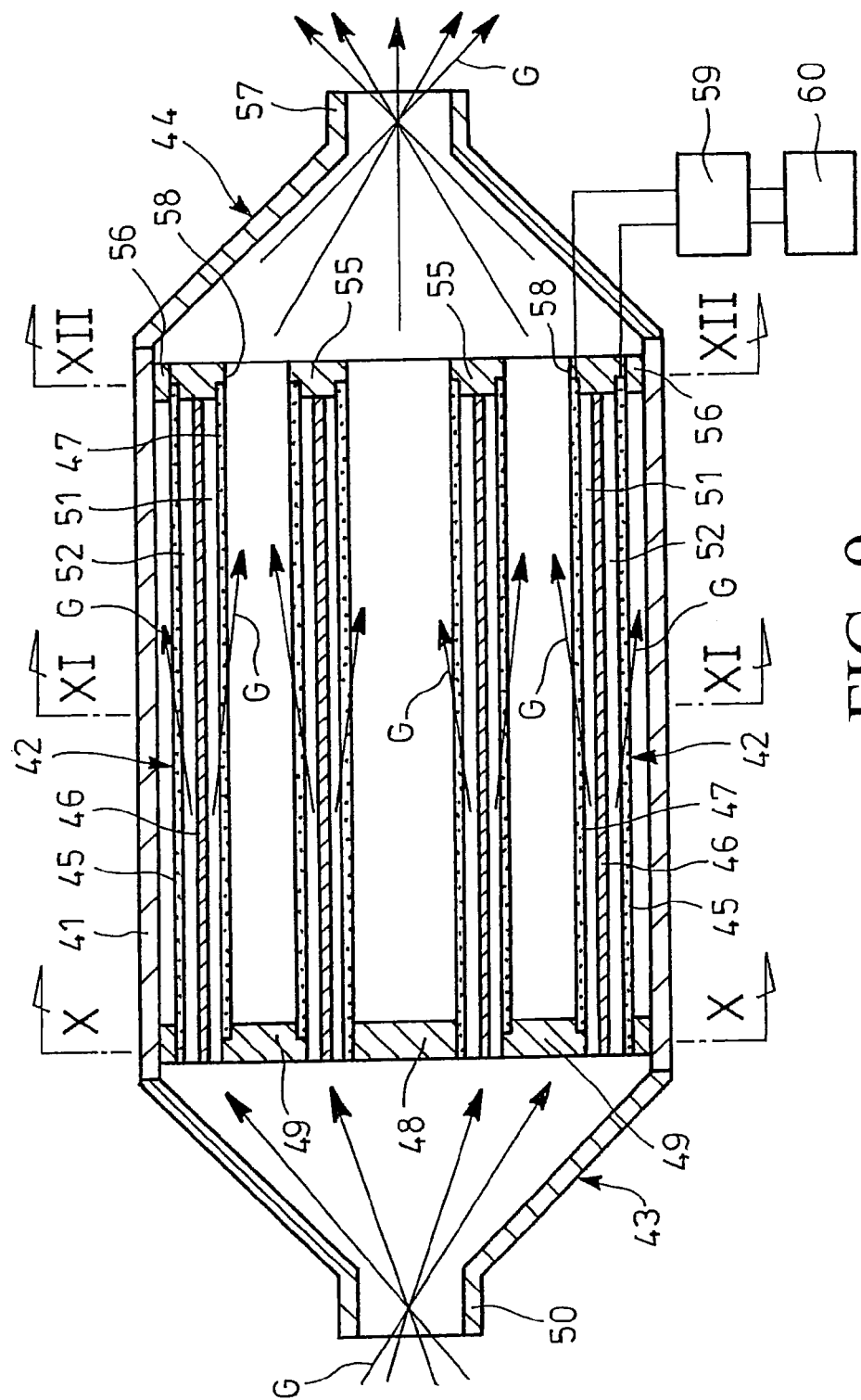
[FIG. 9] A longitudinal sectional view showing a third embodiment of an exhaust emission control device according to the invention.
Figure 10:
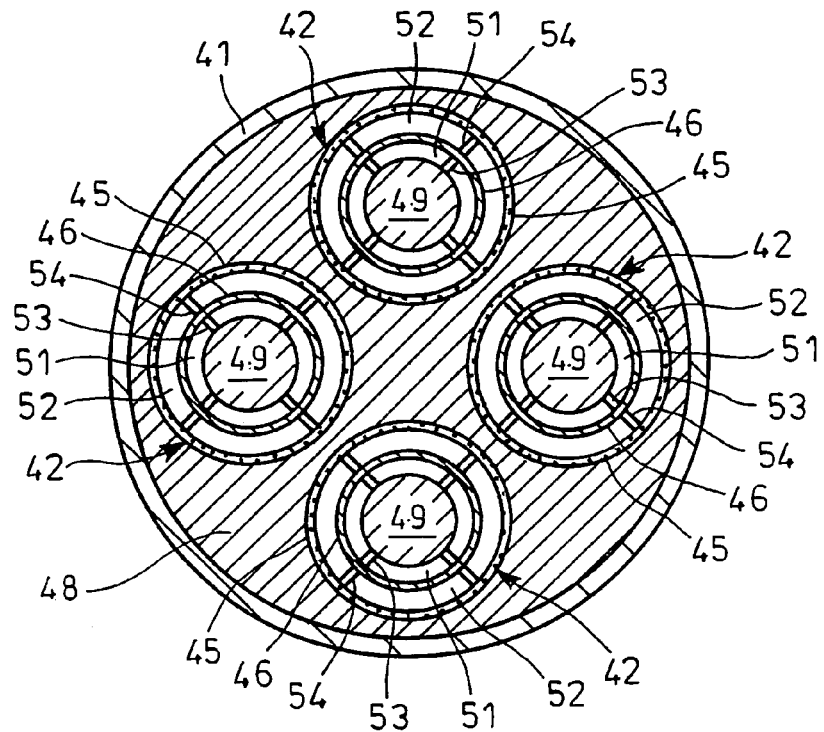
[FIG. 10] A view looking in the direction of arrows X in FIG. 9.
Figure 11:
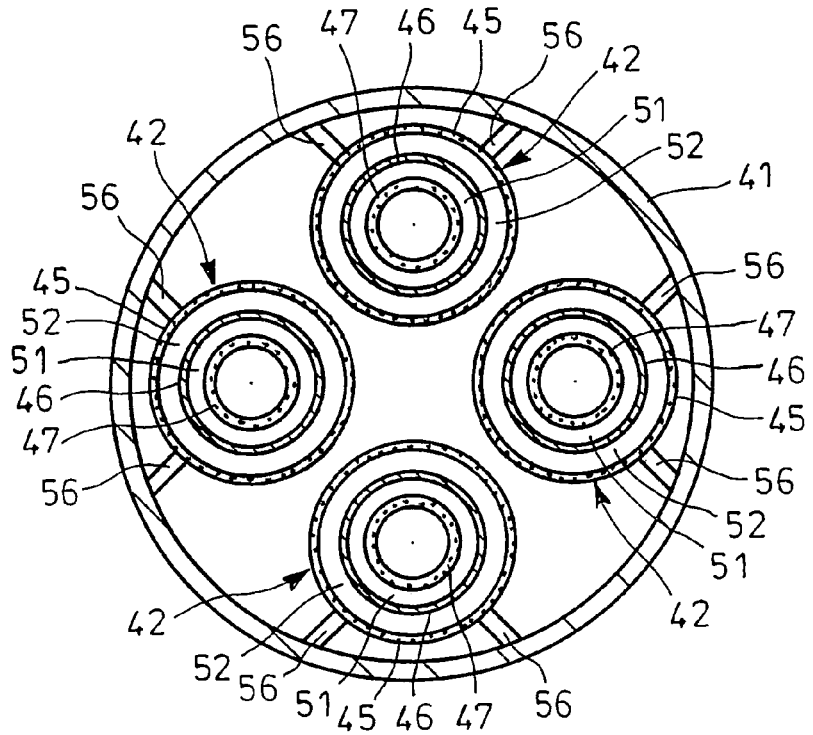
[FIG. 11] A view looking in the direction of arrows XI in FIG. 9.
Figure 12:
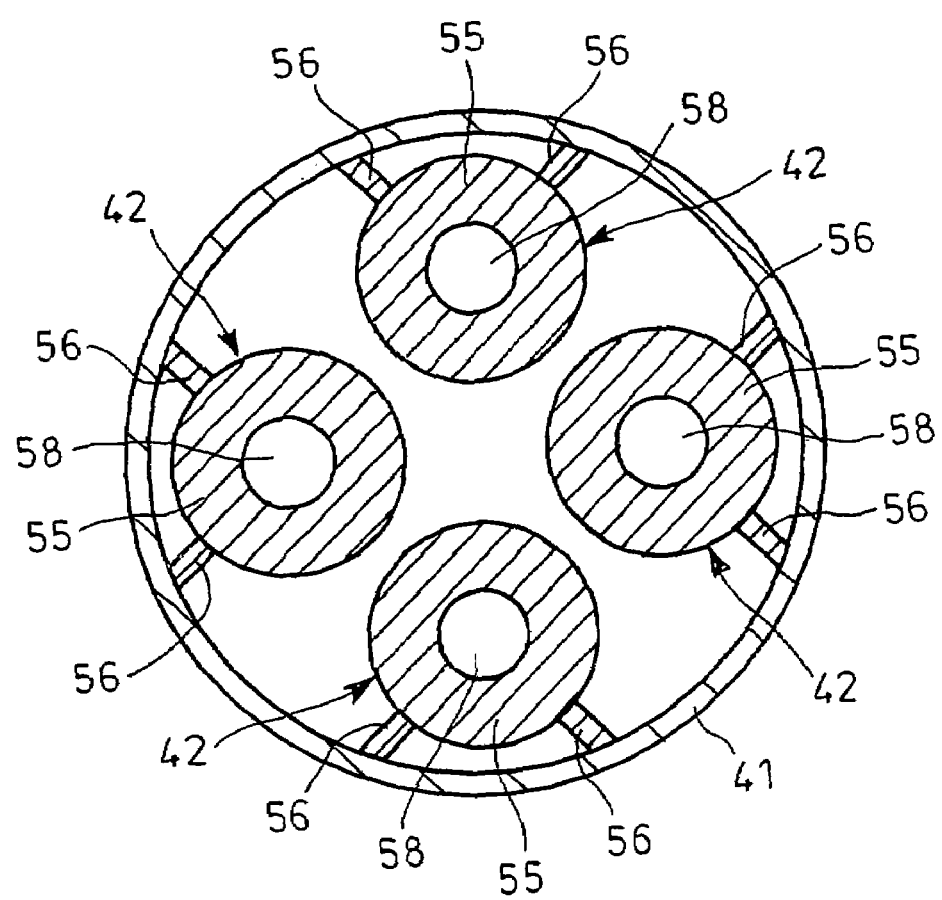
[FIG. 12] A view looking in the direction of arrows XII in FIG. 9.

| | |
|---|---|
| 1, 21, 41 | housing |
| 2, 22, 42 | capturing cell |
| 3, 23, 43 | exhaust divergence means |
| 4, 24, 44 | exhaust convergence means |
| 5, 25, 46 | dielectric |
| 6, 27, 47 | inner electrode |
| 7, 26, 45 | outer electrode |
| 14, 31, 51, 52 | gap |
| 15, 35, 59 | electric discharge controller |

The invention claimed is:

1. An exhaust emission control device comprising:
a plurality of capturing cells each including a cylindrical inner electrode constituted by an electrically conductive filter capable of capturing particulates, a cylindrical dielectric surrounding said inner electrode and a cylindrical outer electrode constituted by an electrically conductive filter capable of capturing particulates and surrounding said dielectric, a cylindrical housing within which said capturing cells are arranged in parallel with each other, exhaust divergence means on one end of the housing and in communication with a gap between an inner surface of the dielectric and an outer surface of the inner electrode in each of the capturing cells and a gap between an inner surface of the outer electrode and an outer surface of the dielectric in each of the capturing cells and exhaust convergence means on the other end of the housing and in communication with an interior of the inner electrode in each of the capturing cells, voltage necessary for generation of electric discharge being applicable across the inner and outer electrodes.

* * * * *